United States Patent
Yamine (10) Patent No.: US 11,870,539 B2
(45) Date of Patent: Jan. 9, 2024

(54) CONTROLLING DISPATCH OF RADIO COVERAGE DRONES

(71) Applicant: Telefonaktiebolaget LM Ericsson (publ), Stockholm (SE)

(72) Inventor: Badawi Yamine, Beirut (LB)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 14 days.

(21) Appl. No.: 17/786,221

(22) PCT Filed: Dec. 19, 2019

(86) PCT No.: PCT/SE2019/051324
§ 371 (c)(1),
(2) Date: Jun. 16, 2022

(87) PCT Pub. No.: WO2021/126030
PCT Pub. Date: Jun. 24, 2021

(65) Prior Publication Data
US 2023/0047909 A1  Feb. 16, 2023

(51) Int. Cl.
*H04B 7/185* (2006.01)
*H04W 24/02* (2009.01)
(Continued)

(52) U.S. Cl.
CPC ........ *H04B 7/18504* (2013.01); *H04W 24/02* (2013.01); *H04W 24/04* (2013.01); *H04W 48/16* (2013.01)

(58) Field of Classification Search
CPC .. H04B 7/18504; H04W 24/02; H04W 24/04; H04W 48/16
See application file for complete search history.

(56) References Cited

U.S. PATENT DOCUMENTS

| | | | |
|---|---|---|---|
| 9,866,313 B1 * | 1/2018 | Murphy | G08G 5/006 |
| 10,362,517 B2 * | 7/2019 | Crawford | H04L 69/40 |

(Continued)

FOREIGN PATENT DOCUMENTS

| | | |
|---|---|---|
| CN | 106792716 A | 5/2017 |
| CN | 109862575 B | 10/2021 |

(Continued)

OTHER PUBLICATIONS

Ladosz, Pawel, et al., "Optimal positioning of communication relay unmanned aerial vehicles in urban environments", IEEE, Loughborough University Institutional Repository, International Conference on Unmanned Aircraft Systems (ICUAS 2016), Arlington, VA USA, https://dspace.lboro.ac.uk/2134/22719, Jun. 7-10, 2016, pp. 1-9.

(Continued)

*Primary Examiner* — James M Perez
(74) *Attorney, Agent, or Firm* — Murphy, Bilak & Homiller, PLLC (57) ABSTRACT

A method for dispatching radio coverage drones to a geographical area of a failing node in a radio network, wherein the radio coverages drones are configured to re-establish operability of the failing node is disclosed. The method comprises steps being performed by a network node of generating (102) a radio coverage map, wherein the generated radio coverage map covers the geographical area of the failing node and geographical areas of adjacent nodes, identifies at least one mobile communication device having radio coverage from at least one of the adjacent nodes, and defines a size of the geographical area of the failing node, dynamically calibrating (103) the defined size of the geographical area of the failing node of the dynamically generated radio coverage map by: calculating (103a) a first distance between the identified mobile communication device and a selected one of the adjacent nodes, wherein the (Continued)

identified mobile communication device has coverage from the selected adjacent node while being geographically closer to the failing node than to the selected adjacent node, deducing (103b) a second distance between the failing node and the selected adjacent node, determining (103d) the actual size of the geographical area of the failing node based on the second and the first distance, and determining (104) a number of radio coverage drones to be dispatched to the geographical area of the failing node, wherein the number of radio coverage drones is based on to the actual size of the geographical area of the failing node. Corresponding computer program product, arrangement, network node, and system are also disclosed.

20 Claims, 4 Drawing Sheets

(51) Int. Cl.
  *H04W 24/04* (2009.01)
  *H04W 48/16* (2009.01)

(56) References Cited

U.S. PATENT DOCUMENTS

| | | | | |
|---|---|---|---|---|
| 10,431,103 | B2* | 10/2019 | Murphy | G08G 5/0034 |
| 10,523,496 | B2* | 12/2019 | Yamine | G06F 11/3466 |
| 10,674,411 | B2* | 6/2020 | Crawford | H04W 36/0083 |
| 10,945,166 | B2* | 3/2021 | Crawford | H04W 36/0083 |
| 10,952,113 | B2* | 3/2021 | Mahkonen | H04W 36/00835 |
| 11,166,206 | B2* | 11/2021 | Crawford | H04L 9/0643 |
| 11,190,032 | B2* | 11/2021 | Farrahi Moghaddam | B60L 53/12 |
| 11,195,345 | B2* | 12/2021 | Nilsson | G08B 25/10 |
| 11,290,923 | B2* | 3/2022 | Akdeniz | H04W 76/11 |
| 11,296,522 | B2* | 4/2022 | Farrahi Moghaddam | H02J 7/0044 |
| 11,356,501 | B1* | 6/2022 | Hashisho | G08G 5/0013 |
| 11,375,472 | B2* | 6/2022 | Rydén | H04W 72/51 |
| 11,412,475 | B2* | 8/2022 | Poscher | G01S 19/396 |
| 11,452,032 | B2* | 9/2022 | Gupta | H04W 4/08 |
| 11,482,117 | B2* | 10/2022 | Sachs | G08G 5/0013 |
| 11,490,299 | B2* | 11/2022 | Crawford | H04L 9/3239 |
| 11,589,397 | B1* | 2/2023 | Sakhnini | H04W 74/002 |
| 11,641,644 | B2* | 5/2023 | Badic | H04W 40/22 370/329 |
| 11,653,241 | B2* | 5/2023 | Yamine | H04W 84/042 370/329 |
| 11,653,292 | B2* | 5/2023 | Azizi | H04W 68/005 370/329 |
| 11,683,728 | B2* | 6/2023 | Akdeniz | H04W 24/10 370/331 |
| 2016/0309337 | A1* | 10/2016 | Priest | H04B 7/2606 |
| 2016/0320775 | A1* | 11/2016 | Priest | B64D 47/08 |
| 2016/0323751 | A1* | 11/2016 | Priest | B64C 39/024 |
| 2016/0371985 | A1* | 12/2016 | Kotecha | G06Q 10/047 |
| 2016/0375984 | A1* | 12/2016 | Priest | B64C 39/022 701/3 |
| 2018/0293897 | A1* | 10/2018 | Murphy | H04W 24/02 |
| 2018/0295546 | A1* | 10/2018 | Crawford | H04L 67/148 |
| 2018/0324032 | A1* | 11/2018 | Yamine | G06F 11/3466 |
| 2019/0044608 | A1* | 2/2019 | Sundaresan | H04W 92/02 |
| 2019/0297544 | A1* | 9/2019 | Crawford | H04L 69/40 |
| 2019/0364492 | A1* | 11/2019 | Azizi | H04W 68/005 |
| 2019/0373521 | A1* | 12/2019 | Crawford | H04L 67/52 |
| 2020/0120458 | A1* | 4/2020 | Aldana | H04W 4/40 |
| 2020/0193729 | A1* | 6/2020 | Nilsson | B64F 5/60 |
| 2020/0205062 | A1* | 6/2020 | Azizi | H04W 4/08 |
| 2020/0229206 | A1* | 7/2020 | Badic | H04W 52/0209 |
| 2020/0236602 | A1* | 7/2020 | Mahkonen | H04W 76/25 |
| 2020/0252838 | A1* | 8/2020 | Akdeniz | H04W 36/0061 |
| 2020/0260349 | A1* | 8/2020 | Crawford | H04L 67/148 |
| 2020/0372811 | A1* | 11/2020 | Lindqvist | H04W 36/14 |
| 2021/0153051 | A1* | 5/2021 | Yamine | H04W 24/08 |
| 2021/0185573 | A1* | 6/2021 | Crawford | G06F 16/9024 |
| 2022/0007213 | A1* | 1/2022 | Mokrushin | H04W 24/08 |
| 2022/0030657 | A1* | 1/2022 | Yamine | H04W 48/12 |
| 2022/0044498 | A1* | 2/2022 | Nilsson | G07C 5/0816 |
| 2022/0167303 | A1* | 5/2022 | Lee | G01S 5/0249 |
| 2022/0191782 | A1* | 6/2022 | Ratasuk | H04W 52/0212 |
| 2022/0207472 | A1* | 6/2022 | Hashisho | B64C 39/024 |
| 2022/0210219 | A1* | 6/2022 | Hashisho | H04B 17/318 |
| 2022/0312277 | A1* | 9/2022 | Akdeniz | H04W 76/11 |
| 2023/0047909 | A1* | 2/2023 | Yamine | H04W 48/16 |
| 2023/0078529 | A1* | 3/2023 | Sakhnini | H04W 72/044 370/329 |
| 2023/0090416 | A1* | 3/2023 | Crawford | H04L 67/148 |
| 2023/0138578 | A1* | 5/2023 | Azizi | H04W 4/44 370/329 |

FOREIGN PATENT DOCUMENTS

| | | |
|---|---|---|
| EP | 2938117 A1 | 10/2015 |
| WO | 2018071453 A1 | 4/2018 |
| WO | 2018082711 A1 | 5/2018 |
| WO | 2018112091 A1 | 6/2018 |

OTHER PUBLICATIONS

Klaine, Valente, et al., "Self-organized for 5G and Beyond Mobile Networks using Reinforcement Learning", School of Engineering, College of Science and Engineering, University of Glasgow, Jul. 2019, 1-199.

* cited by examiner

CONTROLLING DISPATCH OF RADIO COVERAGE DRONES

TECHNICAL FIELD

The present disclosure relates generally to the field of radio coverage drones. More particularly, it relates to controlling dispatch of radio coverage drones to a geographical area of a failing node in a radio network.

BACKGROUND

Drones are useful in various contexts, for example, sending a drone to cover an area where there is a weak or no radio coverage in order to, via the drone, extend wireless signal coverage of radio base stations (RBS).

Other examples comprise drones being used in commercial applications, e.g. to deliver items to customers so that items are delivered quicker and cheaper (no traffic jam and no post exchanges) or drones being used to offload traffic in a wireless network.

Known drones are also capable of landing in front of an equipment, e.g. in front of a RBS, and execute some actions on it, e.g. restart of the RBS or execute of commands etc.

However, there are scenarios where dispatching radio coverage drones to a geographical area of a failing node in a radio network in accordance with known approaches that do not sufficiently solve the problem of the failing node.

Therefore, there is a need for alternative approaches for dispatching radio coverage drones to a geographical area of a failing node in a radio network.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other drawbacks.

According to a first aspect, this is achieved by a method for dispatching radio coverage drones to a geographical area of a failing node in a radio network, wherein the radio coverages drones are configured to re-establish operability of the failing node.

The method comprises steps being performed by a network node.

The method comprises generating a radio coverage map, wherein the generated radio coverage map covers the geographical area of the failing node and geographical areas of adjacent nodes, identifies at least one mobile communication device having radio coverage from at least one of the adjacent nodes, and defines a size of the geographical area of the failing node.

The method further comprises dynamically calibrating the defined size of the geographical area of the failing node of the dynamically generated radio coverage map by calculating a first distance between the identified mobile communication device and a selected one of the adjacent nodes, wherein the identified mobile communication device has coverage from the selected adjacent node while being geographically closer to the failing node than to the selected adjacent node, deducing a second distance between the failing node and the selected adjacent node, determining the actual size of the geographical area of the failing node based on the second and the first distance, and determining a number of radio coverage drones to be dispatched to the geographical area of the failing node, wherein the number of radio coverage drones is based on to the actual size of the geographical area of the failing node.

In some embodiments, the failing node is inoperative due to a network outage in the radio network.

In some embodiments, the method further comprises detecting the network outage in the radio network.

In some embodiments, the generating of the radio coverage map is initiated by triggering a Self-Organizing Network, SON, function in adjacent nodes to the failing node.

In some embodiments, the method further comprises determining a radius of an actual size of the geographical area of the failing node based on the second and the first distance.

In some embodiments, the method further comprises causing dispatch of the determined number of radio coverage drones to the geographical area of the failing node for re-establishment of operability of the failing node.

In some embodiments, the radio coverage drones are configured to re-establish operability of the failing node for a pre-determined geographical coverage area at arrival at the geographical area of the failing node.

In some embodiments, one or more of the radio coverage drones are dispatched to the geographical area of the failing node for landing on or in connection with the failing node.

In some embodiments, one or more of the radio coverage drones are configured to connect directly to the failing node, via a wireless or wired connection, and establish a radio coverage link to the radio network.

In some embodiments, the method further comprises sending a landing location to the radio coverage drones from the network node at dispatch.

In some embodiments, the method further comprises determining an adjusted landing location of the radio coverage drones based on a dynamic change of the actual size of the geographical area of the failing node after dispatch.

In some embodiments, the adjusted landing location of the radio coverage drones is determined at the network node and/or at the radio coverage drones.

In some embodiments, the radio coverage drones are further configured to detect radio coverage.

In some embodiments, the adjusted landing location of the radio coverage drones comprises change of landing location in the geographical area of the failing node or return to a drone dispatch base.

In some embodiments, the dynamic change is based on movements of the at least one mobile communication device having radio coverage from at least one of the adjacent nodes.

In some embodiments, the at least one mobile communication device is in either idle or connected mode.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is an arrangement for a network node configured for dispatching radio coverage drones to a geographical area of a failing node in a radio network, wherein the radio coverages drones are configured to re-establish operability of the failing node.

The arrangement comprises a controller configured to cause generation of a radio coverage map, wherein the generated radio coverage map covers the geographical area of the failing node and geographical areas of adjacent nodes, identifies at least one mobile communication device having radio coverage from at least one of the adjacent nodes, and defines a size of the geographical area of the failing node.

The controller is further configured to cause dynamic calibration of the defined size of the geographical area of the failing node of the dynamically generated radio coverage map by causing calculation of a first distance between the identified mobile communication device and a selected one of the adjacent nodes, wherein the identified mobile communication device has coverage from the selected adjacent node while being geographically closer to the failing node than to the selected adjacent node, deduction of a second distance between the failing node and the selected adjacent node, determination of the actual size of the geographical area of the failing node based on the second and the first distance, and determination of a number of radio coverage drones to be dispatched to the geographical area of the failing node, wherein the number of radio coverage drones is based on to the actual size of the geographical area of the failing node.

In some embodiments, the failing node is inoperative due to a network outage in the radio network.

In some embodiments, the controller is further configured to cause detection of the network outage in the radio network.

In some embodiments, the generation of the radio coverage map is initiated by a triggered Self-Organizing Network, SON, function in adjacent nodes to the failing node.

In some embodiments, the controller is further configured to cause determination of a radius of an actual size of the geographical area of the failing node based on the second and the first distance.

In some embodiments, the controller is further configured to cause dispatch of the determined number of radio coverage drones to the geographical area of the failing node for re-establishment of operability of the failing node.

In some embodiments, the radio coverage drones are configured to re-establish operability of the failing node for a pre-determined geographical coverage area at arrival at the geographical area of the failing node.

In some embodiments, one or more of the radio coverage drones are dispatched to the geographical area of the failing node for landing on or in connection with the failing node.

In some embodiments, one or more of the radio coverage drones are configured to connect directly to the failing node, via a wireless or wired connection, and establish a radio coverage link to the radio network.

In some embodiments, the controller is further configured to cause sending of a landing location to the radio coverage drones from the network node at dispatch.

In some embodiments, the controller is further configured to cause determination of an adjusted landing location of the radio coverage drones based on a dynamic change of the actual size of the geographical area of the failing node after dispatch.

In some embodiments, the adjusted landing location of the radio coverage drones is determined at the network node and/or at the radio coverage drones.

In some embodiments, the radio coverage drones are further configured to detect radio coverage.

In some embodiments, the adjusted landing location of the radio coverage drones comprises change of landing location in the geographical area of the failing node or return to a drone dispatch base.

In some embodiments, the dynamic change is based on movements of the at least one mobile communication device having radio coverage from at least one of the adjacent nodes.

In some embodiments, the at least one mobile communication device is in either idle or connected mode.

A fourth aspect is a network node comprising the arrangement according to the third aspect.

In some embodiments, the network node comprises an Operating Support System, OSS, function.

A fifth aspect is a system comprising the arrangement according to the third aspect and/or the network node according to the fourth aspect.

In some embodiments, the system comprises a communication network.

In some embodiments, the system further comprises radio base stations and mobile communication devices, wherein at least one of the mobile communication devices having radio coverage from at least one of the radio base stations.

Any of the above aspects may additionally have features identical with or corresponding to any of the various features as explained above for any of the other aspects.

An advantage of some embodiments is that alternative approaches for dispatching radio coverage drones to a geographical area of a failing node in a radio network are provided.

Another advantage of some embodiments is that radio coverage is determined before and during dispatch of radio coverage drones.

Yet an advantage of some embodiments is that the number of radio coverage drones may be adapted or adjusted automatically depending on the determined radio coverage.

Yet another advantage of some embodiments is that a minimum number of radio coverage drones may be dispatched.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

As mentioned above, there are scenarios where dispatching radio coverage drones to a geographical area of a failing node in a radio network in accordance with known approaches that do not sufficiently solve the problem of the failing node.

There are two main drawbacks of known approaches; firstly, when a Self-Organizing Network (SON) function is not triggered, it may require a network operator to have an excessive amount of radio coverage drones to cover a large geographical area of network coverage; and secondly, when a SON function is triggered, radio coverage is not known for drones and therefore the number of drones to be dispatched cannot be adapted to correspond to the radio coverage as the radio coverage is not known in advance.

In the following, embodiments will be presented where alternative approaches for dispatching radio coverage drones to a geographical area of a failing node in a radio network are described.

Radio coverage drones, as described herein, typically comprise drones configured to establish, re-establish, and provide radio coverage and/or operability for a RBS, wherein the RBS is inoperative in a radio network.

The radio coverage drones, as described herein, are typically further configured to be dispatched to a geographical area of an inoperative RBS (i.e. failing node) for establishing, re-establishing, and providing radio coverage and/or operability to the inoperative RBS.

An inoperative RBS, as described herein, typically comprises a RBS with any one of hardware failure, software failure, loss of network connectivity, and failure of a state transfer. Hence, the inoperative RBS may be prevented for some reason to communicate with the radio network.

Alternatively or additionally, radio coverage drones may interchangeably be referenced as radio coverage providing drones.

The radio coverage drones, as described herein, may in addition to establish, re-establish, and provide radio coverage for a RBS be configured provide maintenance and may for those instances be referenced as maintenance drones.

Maintenance drones, as described herein, may comprise onsite robots for repairing sites, wherein the onsite robot may have a flexible arm and be configured to connect to the RBS and e.g. repair it.

All radio coverage drones may not comprise onside robots due to cost issues, for those radio coverage drones that do not comprise onside robots they are still able to establish, re-establish and provide radio coverage accordingly while the radio coverage drones that do comprise onsite robots are further capable of connecting to the RBS, for example for repairing a faulty RBS.

Figure 1:
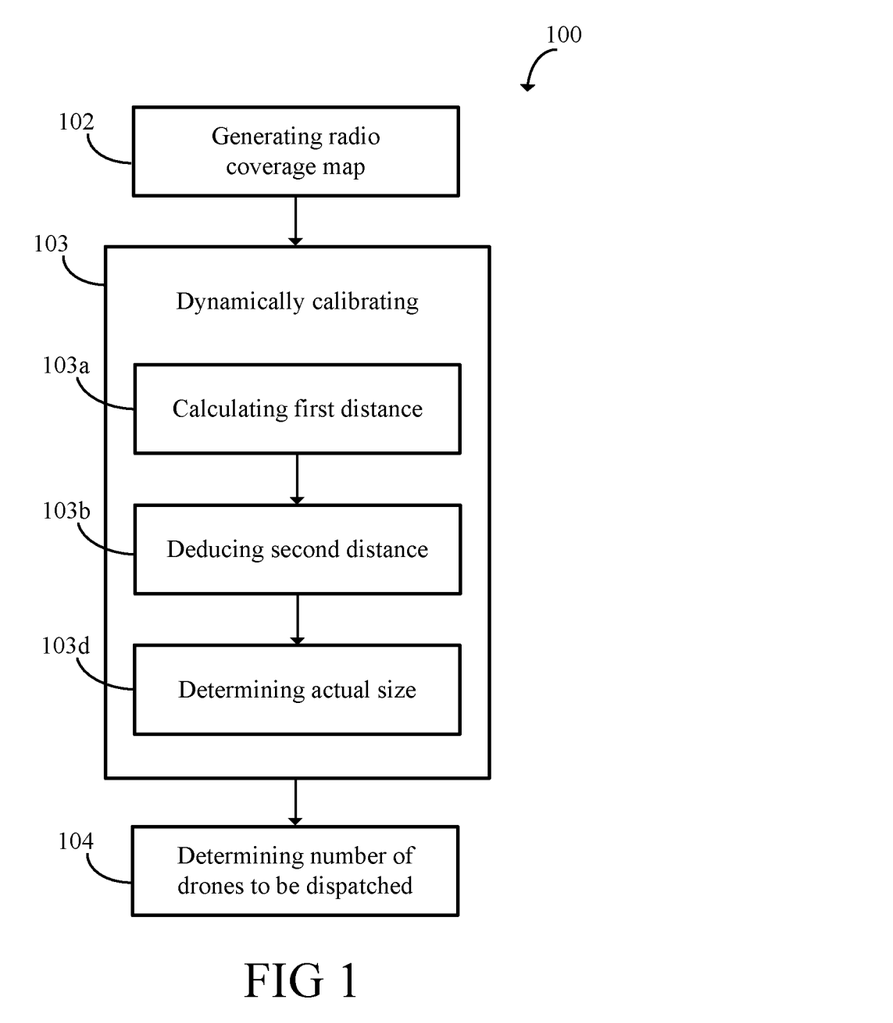
FIG. 1 is a flowchart illustrating example method steps according to some embodiments.
Figure 3:
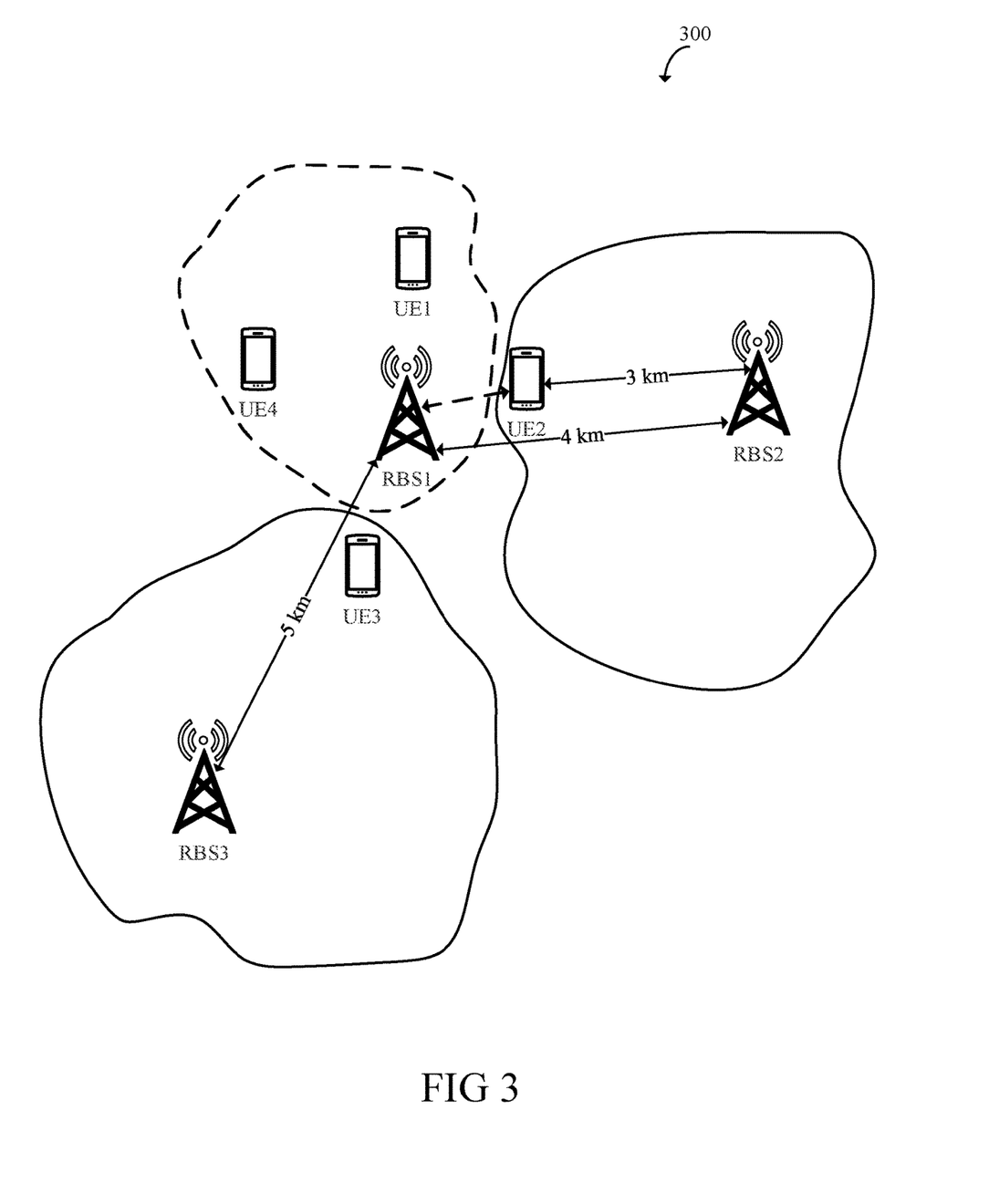
FIG. 3 is a schematic drawing illustrating example radio base stations and mobile communication devices according to some embodiments.

FIG. 1 is a flowchart illustrating method steps of an example drone dispatch controlling method 100 according to some embodiments. The drone dispatch controlling method 100 is for dispatching radio coverage drones to a geographical area of a failing node in a radio network, wherein the radio coverages drones are configured to re-establish operability of the failing node. Thus, the drone dispatch controlling method 100 may, for example, be performed by the arrangement 400 of FIG. 4 and/or the processor 520 in the computer program product 500 of FIG. 5 in environments comprising radio base stations and mobile communication devices as illustrated in FIG. 3; all of which will be described later herein.

The drone dispatch controlling method 100 comprises the following steps being performed by a network node.

In some embodiments, the network node comprises an Operating Support System, OSS, function.

Alternatively or additionally, the network node may comprise any remote server in connection with a cloud service configured to perform the following steps.

For example, the OSS function may comprise support management functions such as network inventory, service provisioning, network configuration, and fault management.

In some embodiments, the failing node is inoperative due to a network outage in the radio network.

For example, the area of radio coverage of every node may be determined using existing network coverage maps available to the network operator. Suppose that before the node fails, it was covering an area with a radius of 3 km, immediately after the node outage, the failing node may lose radio coverage for an area around the failing node; i.e., a radius of 3 km which is equal to the size of the covered area by the node before the outage.

It follows two options:
($1^{st}$ option) If SON function is not triggered, assuming that the size of the area of the failing node will remain 3 km and in such case an existing solution consists of sending a number of radio coverage drones by simply dividing 3 km by the coverage area of the radio coverage drone, e.g., if a radio coverage drone covers an area of 500 meters, then six radio coverage drones will be sent onsite.

($2^{nd}$ option) If SON function is triggered, e.g., neighbours RBS2 & RBS3 adjust their antenna tilt in order to cover as much as possible the area of the failing node, then the size of the area of the failing node is reduced, see FIG. 3, and as a consequence the number of radio coverage drones to be sent with the $2^{nd}$ option will be less than the case with the $1^{st}$ option. This is beneficial for the operator as it allows him to operate a large area of network outage with fewer number of radio coverage drones than it is the case with the $1^{st}$ option. It is this $2^{nd}$ option that will be described later herein.

In step 102, a radio coverage map is generated, wherein the generated radio coverage map covers the geographical area of the failing node and geographical areas of adjacent nodes, identifies at least one mobile communication device having radio coverage from at least one of the adjacent nodes, and defines a size of the geographical area of the failing node.

The radio coverage map may be generated using any suitable (known or future) approach.

For example (reference to FIG. 3), the radio coverage map may comprise the geographical areas of the failing node RBS1 and two adjacent nodes RBS2, RBS3, four mobile communication devices UE1, UE2, UE3, UE4 located in the geographical areas of the failing node and/or the two adjacent nodes, wherein one of the four mobile communication devices having radio coverage from one of the two adjacent nodes RBS2, RBS3, and a size of the geographical area of the failing node (i.e. area without radio coverage) of 3 km in radius.

Alternatively or additionally, the radio coverage map may further comprise other information relating to the radio coverage of the geographical area of the failing node and the adjacent nodes.

In some embodiments, the generating of the radio coverage map is initiated by triggering a Self-Organizing Network (SON) function in adjacent nodes to the failing node.

For example, at triggering of the SON function in the network the adjacent nodes will adjust their antennas/transmit power in a way to cover as much as possible of the geographical area of the failing node e.g. the antennas of the adjacent nodes are up-tilted so that the radio coverage of the adjacent nodes are extended. By requesting the adjacent nodes, when adjustment of the antennas/transmitted power has been performed, to request the mobile communication devices having coverage of the adjacent nodes to report their locations together with their radio measurements, while the mobile communication devices are either in idle or connected mode.

As the subscribers of the mobile communication devices move around in the geographical areas of the failing node and the adjacent nodes, the radio coverage map may change accordingly based on the movements.

When the radio coverage map does not comprise any mobile communication devices, the network node may need to wait a defined or undefined period of time for a mobile communication device to pass by the geographical areas of the failing node and the adjacent nodes in order to determine if there is radio coverage at the location of the mobile communication device.

Therefore, generating radio coverage maps may depend on the actual locations of the mobile communication devices and the number of mobile communication devices may be high during the day and might be low during the night.

Hence, instead of immediately dispatching radio coverage drones to the geographical area of the failing node, the SON function is triggered and the radio coverage map is generated.

In step 103, the defined size of the geographical area of the failing node of the dynamically generated radio coverage map is dynamically calibrated by execution of step 103*a*, 103*b*, and 103*d*.

In step 103*a*, a first distance between the identified mobile communication device and a selected one of the adjacent nodes is calculated, wherein the identified mobile communication device has coverage from the selected adjacent node while being geographically closer to the failing node than to the selected adjacent node.

For example, the network node may calculate a first distance to be 3 km between the identified mobile communication device and the selected one of the adjacent nodes (reference to FIG. 3).

In step 103*b*, a second distance between the failing node and the selected adjacent node is deduced.

For example, the network node may deduce the second distance to be 4 km between the failing node and the selected adjacent node (reference to FIG. 3).

In step 103*d*, the actual size of the geographical area of the failing node is determined based on the second and the first distance.

For example, the network node may determine the actual size of the geographical area as a difference between the second and first distance.

For example, the network node may determine that based on the second and the first distance that the actual size of the geographical area of the failing node is around 1 km in radius (i.e. 4 km-3 km) (reference to FIG. 3).

In step 104, a number of radio coverage drones to be dispatched to the geographical area of the failing node is determined, wherein the number of radio coverage drones is based on to the actual size of the geographical area of the failing node.

For example, the number of radio coverage drones to be dispatched should be a minimum number of radio coverage drones required to re-establish operability of the failing node.

In some embodiments, the radio coverage drones are configured to re-establish operability of the failing node for a pre-determined geographical coverage area at arrival at the geographical area of the failing node.

For example, the number of radio coverage drones to be dispatched may be determined to be only two radio coverage drones, each having a radio coverage of 500 meters.

In some embodiments, the number of radio coverage drones to be dispatched may be determined to be zero.

For example, when it is determined that the number of radio coverage drones to be dispatched is zero, then no radio coverage drones are dispatched.

Alternatively or additionally, if a number of radio coverage drones has been determined to be dispatched and have been so, the determined number may be adjusted during the travel of the radio coverage drones to the geographical area of the failing node, by communicating by the network node to the dispatched radio coverage drones that either the number of determined radio coverage drones has been adjusted and calling back the remaining radio coverage drones or the number of determined radio coverage drones has been determined to be zero as the SON function in the network has successfully restored the radio coverage for the failing node and that the radio coverage drones should return to the droned dispatch base.

Therefore, an excessive number of radio coverage drones dispatched to a geographical area of a failing node is avoided.

In some embodiments, one or more of the radio coverage drones are dispatched to the geographical area of the failing node for landing on or in connection with the failing node.

In some embodiments, one or more of the radio coverage drones are configured to connect directly to the failing node, via a wireless or wired connection, and establish a radio coverage link to the radio network In some embodiments, a landing location is sent to the radio coverage drones from the network node at dispatch.

In some embodiments, an adjusted landing location of the radio coverage drones is determined based on a dynamic change of the actual size of the geographical area of the failing node after dispatch.

In some embodiments, the adjusted landing location of the radio coverage drones is determined at the network node and/or at the radio coverage drones.

In some embodiments, the radio coverage drones are further configured to detect radio coverage.

In some embodiments, the adjusted landing location of the radio coverage drones comprises change of landing location in the geographical area of the failing node or return to a drone dispatch base.

In some embodiments, the dynamic change is based on movements of the at least one mobile communication device having radio coverage from at least one of the adjacent nodes.

In some embodiments, the at least one mobile communication device is in either idle or connected mode.

Hence, in view of above method steps, dispatching radio coverage drones to a geographical area of a failing node in a radio network is enabled.

Figure 2:
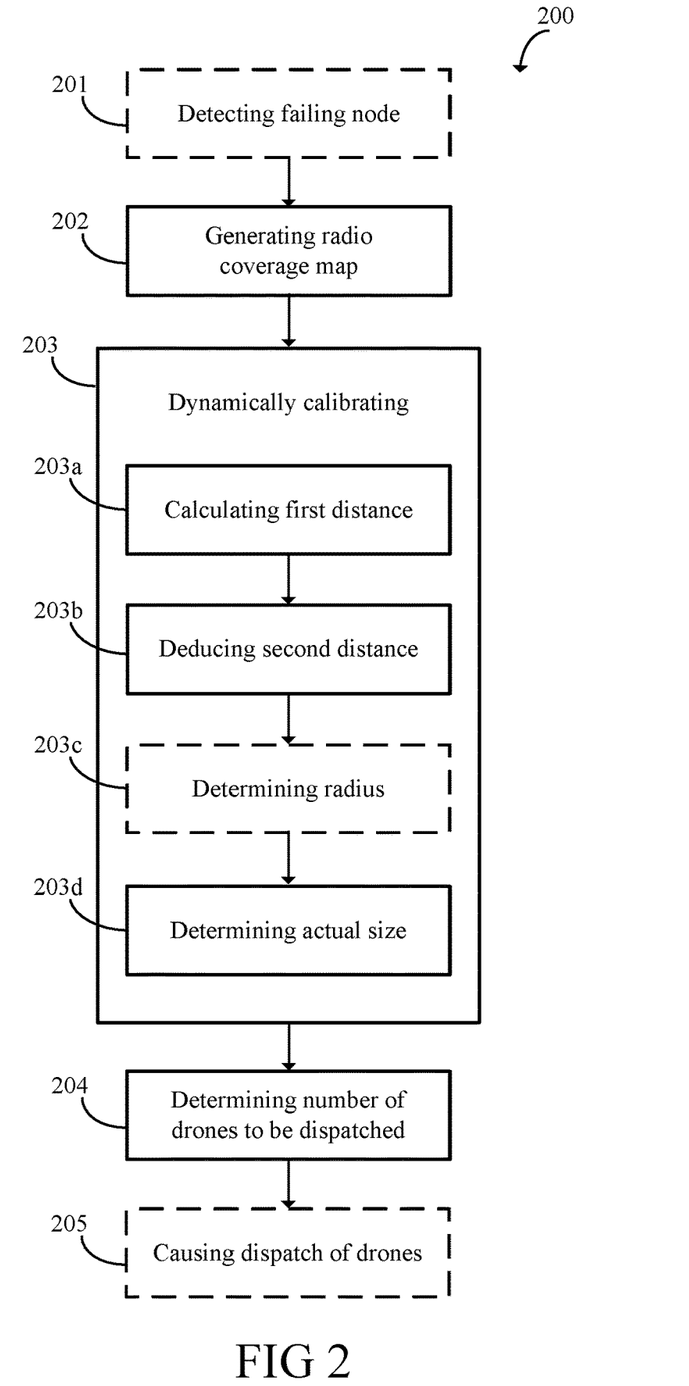
FIG. 2 is a flowchart illustrating example method steps according to some embodiments.

FIG. 2 is a flowchart illustrating method steps of an example drone dispatch controlling method 200 according to some embodiments. The drone dispatch controlling method 200 is for dispatching radio coverage drones to a geographical area of a failing node in a radio network, wherein the radio coverages drones are configured to re-establish operability of the failing node. Thus, the drone dispatch controlling method 200 may, for example, be performed by the arrangement 400 of FIG. 4 and/or the processor 520 in the computer program product 500 of FIG. 5 in environments comprising radio base stations and mobile communication devices as illustrated in FIG. 3; all of which will be described later herein.

The drone dispatch controlling method 200 comprises the following steps being performed by a network node.

In optional step 201, in some embodiments, the network outage in the radio network is detected.

In step 202, corresponding to step 102 of FIG. 1, a radio coverage map is generated, wherein the generated radio coverage map covers the geographical area of the failing node and geographical areas of adjacent nodes, identifies at least one mobile communication device having radio coverage from at least one of the adjacent nodes, and defines a size of the geographical area of the failing node.

In step 203, corresponding to step 103 of FIG. 1, the defined size of the geographical area of the failing node of the dynamically generated radio coverage map is dynamically calibrated.

In step 203a, corresponding to step 103a of FIG. 1, a first distance between the identified mobile communication device and a selected one of the adjacent nodes is calculated, wherein the identified mobile communication device has coverage from the selected adjacent node while being geographically closer to the failing node than to the selected adjacent node.

In step 203b, corresponding to step 103b of FIG. 1, a second distance between the failing node and the selected adjacent node is deduced.

In optional step 203c, a radius of an actual size of the geographical area of the failing node is determined based on the second and the first distance.

For example, the network node may determine that based on the second and the first distance that the radius of the actual size of the geographical area of the failing node is around 1 km in radius (i.e. 4 km-3 km) (reference to FIG. 3).

In step 203d, corresponding to step 103d of FIG. 1, the actual size of the geographical area of the failing node is determined based on the second and the first distance.

In step 204, corresponding to step 104 of FIG. 1, a number of radio coverage drones to be dispatched to the geographical area of the failing node is determined, wherein the number of radio coverage drones is based on to the actual size of the geographical area of the failing node.

In optional step 205, in some embodiments, the determined number of radio coverage drones is caused to be dispatched to the geographical area of the failing node for re-establishment of operability of the failing node.

For example, step 205 may comprise dispatching the radio coverage drones or sending a control signal configured to cause dispatch of the radio coverage drones.

For example, when the radius of the actual size of the geographical area of the failing node determined to be around 1 km then it may be determined that the number of radio coverage drones to be dispatched to be only two radio coverage drones, each having a radio coverage of 500 meters.

Any of the above steps for FIG. 2 may additionally have features identical with or corresponding to any of the various features as explained above for FIG. 1.

Hence, in view of above method steps, dispatching radio coverage drones to a geographical area of a failing node in a radio network is enabled.

FIG. 3 is a schematic drawing illustrating example radio base stations RBS1, RBS2, RBS3 and mobile communication devices UE1, UE2, UE3, UE4 according to some embodiments. The example radio base stations RBS1, RBS2, RBS3 and mobile communication devices UE1, UE2, UE3, UE4 provide the environment 300 for performing the method steps of FIG. 1 and FIG. 2 by the arrangement 400 of FIG. 4 and/or the processor 520 in the computer program product 500 of FIG. 5; all of which will be described later herein.

Figure 4:
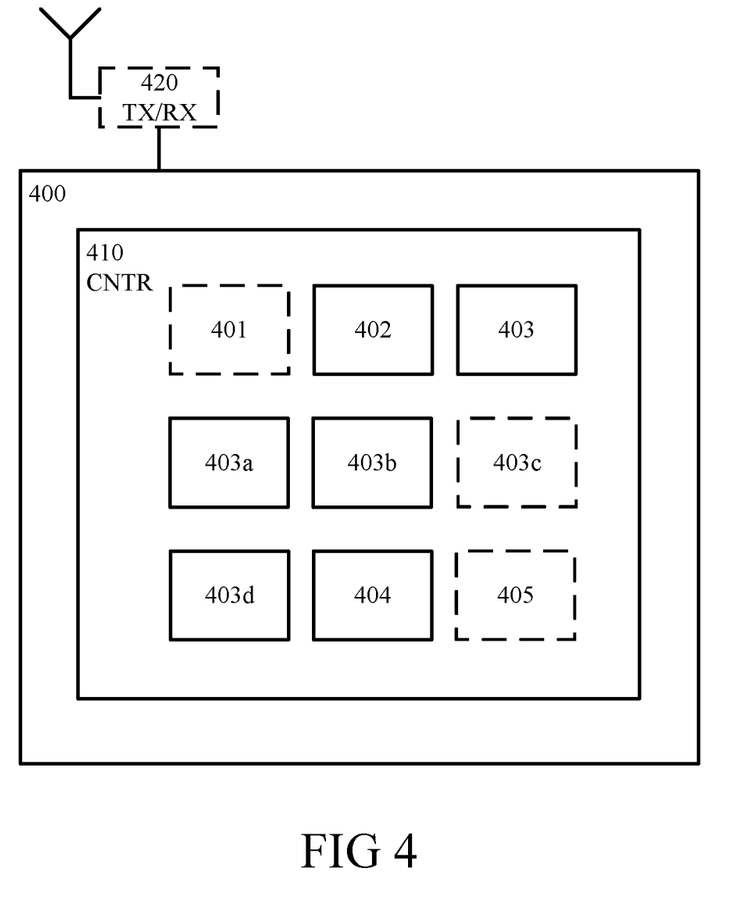
FIG. 4 is a schematic block diagram illustrating an example arrangement according to some embodiments.

Alternatively or additionally, the environment may comprise a network node (not shown) configured for performing the method steps of FIG. 1 and FIG. 2 and/or the arrangement 400 for the network node of FIG. 4.

For example, the network node may comprise the arrangement 400 of FIG. 4.

FIG. 3 illustrates a scenario wherein RBS1 is inoperative due to a network outage in the radio network and wherein the defined geographical area of the inoperative RBS1 is dynamically calibrated.

The distance, between RBS1 and the closest UE, that may receive radio coverage from adjacent nodes RBS, RBS2, is calculated. For that purpose, two methods are used:

For UEs in connected mode, first the distance between RBS2 but also of RBS3 to RBS1 is calculated via the network node comprising an Operating Support System (OSS) function, where the location of every RBS is defined, and is then converted into TA (Timing Advance) units before being given to RBS2 & RBS3. RBS2 and RBS3 will then only ask UEs in connected mode that are far away from RBS2 & RBS3 antennas which means they will ask only UEs which have biggest TA value (so far from RBS2 & RBS3 and closer to RBS1).

For UEs in idle mode, as it was the case for UEs in connected mode, the purpose is not to calculate the radio coverage map based for all UEs in idle mode under RBS2 and RBS3. Hence, this is not done because it is processing and time consuming. The purpose is only to estimate the distance between RBS1 and closest UE that is receiving coverage from RBS2 or RBS3 in order to calculate the first distance and later estimate the number of radio coverage drones to be sent on site. For that purpose, RBS2 and RBS3 will broadcast the following two requests for all UEs in idle mode: Asking them to trigger a 'force' Tracking Area Update (TAU) (first request) and this is done only by UE which has radio conditions below a predefined threshold (second request). The threshold should affect only UE far away from RBS2 & RBS3, which correspond well to the UEs which are close to RBS1. Note that by 'force' TAU is meant the existing periodical TAU procedure where the periodic timer has been reduced to few minutes.

The network has access to factory information of the radio coverage drones, e.g. maximum power transmission, maximum coverage distance, available frequency etc. and such information. By combining the estimated distance, as described above, and by knowing the factory information, the network could estimate the number of radio coverage drones to be sent on site.

In one embodiment, in an initial state:

At time t1, after RBS1 outage, Self-Organizing Network (SON) functions are triggered at adjacent nodes of RBS1 that are RBS2 & RBS3 and they start calculating distances, as described above. At the same time, the following action is triggered:

The radio coverage drones, comprising either only radio coverage drones or radio coverage drones and maintenance drones, will be sent to the site. However, while the radio coverage drones are flying, based on the UEs movement in area of RBS1, the value of estimated distances will be changing and as a result the radio coverage drones, might be expecting at any time to receive from the network new updated landing Location X' and Location Y'.

In one embodiment, in an initial state:

At time t1, after RBS1 outage, either SON functions is not triggered or the flying radio coverage drones should not expect at any time to receive new updated landing location. However, each of the radio coverage drones will be given an initial landing location, e.g. Location X and Location Y. The following actions are taken by the radio coverage drones, which may comprise either only radio coverage drones or radio coverage drones and maintenance drones.

Each of the flying radio coverage drones is equipped with a radio coverage detector. Suppose that a first radio coverage drone to land is given Location X however it detects 'no radio' coverage at Location Z. Then, the action taken by that first radio coverage drone will depend on the Location Z in comparison to Location X. If Location Z<Location X then most probably the first radio coverage drone has passed by a hole of radio coverage and in that case the radio coverage drone will continue its flight to location X. If Location Z is equal or around Location X then the first radio coverage drone will land at that Location Z. If Location Z>Location X then the first radio coverage drone will land also at that Location Z meaning that initial Location X was not accurately estimated.

When a radio coverage drone, either as radio coverage drone or as a maintenance drone, reaches the site it executes one or all of the following actions:

First action: In an uplink direction, the radio coverage drone could report to the network, in real time, all its actions and their results.

Second action: In an downlink direction, the network or an operator staff, e.g. via the network node comprising the OSS function, could command the radio coverage drone to take actions in real time, e.g. execute some commands or procedures.

When one, or many, cell(s)/site(s), e.g. one RBS, RBS1, goes down there is a big probability, depending on network configuration, that SON functions are triggered in order to cover all or as much as possible of the geographical area that was covered by RBS1.

In such case, when SON function is activated, the network does not know in advance the new coverage border of RBS2 & RBS3. The antennas of RBS2/RBS3 might change their directions, tilt, and/or increase their transmitted power of neighbouring in order to cover the geographical location of RBS1 or not. As a result the geographical area affected by RBS1 outage changes dynamically and hence, there is a need for a method to detect the updated borders of the radio coverage of RBS2 & RBS3.

In a first scenario, UEs are in connected mode (initial state—RBS 1 goes into outage):

The network node controlling all RBS in the network will be immediately aware of RBS1 outage as it receives an alarm, e.g. RBS1 has been disconnected alarm, the network node 'OSS_UEs_map_after_RBS_outage' will ask the RBS that are neighbours, i.e. adjacent nodes, of RBS1, which in the figure are RBS2 and RBS3, to detect the location of any UE on communication at the edge of RBS2 & RBS3. In other words, the role of RBS2 & RBS3 is to create a coverage map of RBS2 & RBS3 after RBS1 outage in order to estimate the closest distance of coverage loss to RBS1. Note that in case SON functions have been activated due to RBS1 outage, the size of coverage of RBS2 & RBS3 would increase to cover the geographical area of RBS1.

As the geographical location of every RBS in the network is already known to the network, including RBS1, RBS2 and RBS3, then due to the network node, the distance between RBS2 to RBS1, as well as the distance between RBS3 to RBS1, are converted into Timing Advance (TA) units and given respectively to RBS2 and RBS3.

After RBS1 outage, RBS2 and RBS3 will start the detection of any UE on communication with them which has respectively a TA value that is closer to RBS1. In other words, not all connected UEs will be asked to send their location, but only the ones which are located at the border of RBS2 or RBS3. In fact, the intention of the network is to get as many UEs that are close to RBS1 for the purpose of knowing how many drone2 are required to cover RBS1 site and it is not to build a radio coverage map for all UEs located at RBS2 or RBS3. Then, for those UEs with TA value closer to RBS1 site, RBS2 & RBS3 will ask that UEs to report its exact location, Location_UE, based on any prior art location method. This is done because taking TA alone will give how far the UE is far away from the antenna of RBS2 or RBS3 but it does not reveal the exact location of that UE.

If at least one UE has its Location_UE equal or close to RBS1 site location then the network would conclude that any radio coverage drone to be sent onsite will have a wireless communication there and hence, in such case there is no need to send another radio coverage drone to cover the area of RBS1 where the robot coverage drone will be landing.

Otherwise, if the farthest UE, Location_UE_closest_to_RBS1, in communication to RBS2 and RBS3 is still far away from RBS1 site, then the estimated distance will be defined as the distance between Location_UE_closest_to_RBS1 and RBS1. In such scenario, as RBS1 site does not have any radio coverage one or more radio coverage drones for covering the area with loss of coverage are needed to be sent onsite.

In a second scenario, UEs are in idle mode (initial state—RBS 1 goes into outage):

Immediately after RBS1 outage, the OSS will send a command to the cells of RBS2 and RBS3 to ask every UE under their coverage to trigger a 'forced' Tracking Area Update (TAU) procedure. Actually, in live networks every UE under a LTE cell will perform a periodical TAU procedure to report to the network in which Tracking Area Code (TAC) the UE is actually located. Usually, the value of the periodical TAU is around 60 minutes.

This 'forcing' of TAU could be done, e.g. by reducing the value of the timer of periodical TAU procedure from actual 60 minutes to very few minutes. As a result, all UEs under the coverage of the cells of RBS2 & RBS3 will be performing periodical TAU procedure every few minutes. Such procedure has the objective of estimating the location of every UE under the coverage of RBS2 and RBS3. The location of the UE is calculated by the network via any prior art method, e.g. Observed Time Difference of Arrival (OT-DOA). Note that in case SON functions have been activated due to RBS1 outage, the size of coverage of RBS2 & RBS3 would increase in comparison to RBS2 & RBS3 coverage before RBS1 outage has occurred. This is normal as SON asks RBS2 & RBS3 to adjust their antennas and power to cover the geographical area of RBS1 that went down.

As it was the case with the scenario for UEs in connected mode, here as well the intention is not to build a radio coverage map for all UEs under RBS2 and RBS3, rather we are only interesting in knowing the locations of the UEs which are closer to RBS1 in the purpose of knowing how many radio coverage drones are needed to be sent on site. For that purpose, for all UEs in idle mode under RBS2 and RBS3 the following two information are broadcasted: First information consists of sending a bad radio coverage threshold, this will include all UEs at border to RBS2/RBS3 and potentially close to RBS1. Second information is any UE verifying that bad radio coverage threshold will trigger the 'forced' TAU procedure in order to guess its location.

If there is at least one UE beside RBS1 that is receiving radio coverage, then there is no need to send a second radio coverage drone to provide radio coverage.

Otherwise, if the farthest UE in communication to RBS2 and RBS3 is still far away from RBS1 site, then estimated distance for UE in idle mode, will be defined as the closest distance between RBS1 geographical site location and the closest geographical point that is being covered by RBS2 or RBS3. In such scenario, as RBS1 site is not covered a second radio coverage drone for covering the area with loss of coverage is needed.

In order to estimate the number of radio coverage drones to be sent onsite, following two information are needed:

Estimated distance is defined as the distance of loss of coverage between site of RBS1 and the closest UE that gets a radio coverage from any neighbouring RBS, RBS2 or RBS3. Note that estimated distance is already calculated above in two different scenarios.

Factory information could be taken from radio coverage drones factory. It comprises knowing how much distance, the antennas of a radio coverage drone could send the radio signal. Such factory information depends on many factors, e.g.

the frequency that is being used by radio coverage drone, the transmission power of its mounted radio unit, and the altitude at which the radio coverage drone will be broadcasting etc.

Based on the estimated distance & factory information, the network may be able to send the exact number of radio coverage drones.

For example, suppose that radio coverage drone maximum coverage distance is 200 meters and suppose that estimated distance is estimated to be around 1 km then in such example:

Five radio coverage drones are needed to provide coverage.

In addition, the network node controlling the radio coverage drones could tell each radio coverage drone where to sit, or say land, in the space, that is at which geographical location so that the 5×200 meters cover the RBS1 loss of coverage in the area where the onsite robot drone will be landing.

Suppose that that two radio coverage drones, first and second, will be sent onsite, together with the onside robot drone, and the location of landing is Location X and Location Y. Suppose that on the road to RBS1 Location X is closer to the drone dispatch base than Location Y. Suppose also that radio coverage drone is the first radio coverage drone to be landing at Location X and the second radio coverage drone to be landing at a further distance Location Y. In such example the final trajectory of the drones will be as follows:

first radio coverage drone & second radio coverage drone fly simultaneously from the drone dispatch base with a maintenance drone.

The three radio coverage drones will then pass by RBS2 or RBS3 radio coverage, then pass by Location X (where the first radio coverage drone will land), the two other drones will then continue their trajectory until they reach Location Y, (where the second radio coverage drone will land), then the maintenance drone will continue alone until it reaches RBS1 site.

Suppose that the estimated travel time for a drone2 to reach RBS1 site from its drone2 station is around 30 minutes.

There are two solutions for the radio coverage drones to get any updated location of landing:

(1) the radio coverage drone gets their updated location of landing from the network node, or (2) the radio coverage drone gets their updated location of landing autonomously.

(1) Radio coverage drone gets their updated location of landing from the network node:

Immediately after RBS1 outage, the network sends two radio coverage drones & one maintenance drone, with their given location of landing Location X (for the first radio coverage drone) and Location Y (for the second radio coverage drone).

While the two radio coverage drones, first and second, are heading towards RBS1 location, by the time to reach there, e.g. after 30 minutes, RBS2 & RBS3 will be building their new radio coverage map after the SON functions in the network have been triggered due to RBS1 outage. Such map will be variable and dynamic depending on the number of UEs either existing or passing in the surrounding of RBS1 at the time of its outage. As a result, the borders of RBS2 & RBS3 could change at any time, before the first and second radio coverage drones reach their initial location of landing, Location X & Location Y. Based on the resulted dynamic radio coverage map, the network node comprising the OSS function could ask the radio coverage drones to ignore Location X & Y and rather takes into consideration new locations of landing, e.g. Location_X' and Location_Y'.

(2) Radio coverage drone gets their updated location of landing autonomously:

The two radio coverage drones & maintenance drone, will be sent to the site immediately after RBS1 outage with the difference that none of the two radio coverage drones do expect to be given any updated landing Location X' & Y' while it is heading to the geographical area of RBS1.

Rather each radio coverage drone has a mean to detect the level of radio signal coverage in its surroundings.

Suppose that initially, when first and second radio coverage drone, were sent to site they were given landing locations respectively at Location X for the first radio coverage drone and Location Y for the second radio coverage drone. On their way to RBS1 site, first and second radio coverage drone, will land themselves in the space as follows: the first radio coverage drone, detects a loss of coverage at Location Z.

If that Location Z is closer to the drone dispatch base than Location X then the first radio coverage drone most probably will ignore it as this might be considered as a normal coverage hole in the area of RBS2 or RBS3 and it is not related to RBS1. Unless by coincidence RBS2 or RBS3 goes into outage while first radio coverage drone is travelling to the geographical area of RBS1 but in such case the network node comprising the OSS function will be aware of such new outage of RBS2 or RBS3 and then it could send in real time an updated Location X" and Location Y" to the first and second radio coverage drones.

If that Location Z is in the surroundings of the given Location X then the first radio coverage drone will land in that location and start broadcasting its radio coverage in the direction of RBS1. The second radio coverage drone as well as the maintenance drone, receiving from now on, radio coverage from first radio coverage drone will continue their trajectory respectively towards location Y (for the second radio coverage drone) and towards RBS1 site (for maintenance drone).

If that Location Z is further than the given Location X which means that the new Location X is closer to RBS1 than it was initially been estimated, then the first radio coverage drone will land in that new Location Z which is closer to RBS1 from given Location X and the second radio coverage drone as well as the maintenance drone will continue their trajectory, respectively towards Location Y (for the second radio coverage drone) and towards RBS1 site (for maintenance drone).

For what concerns the procedure of landing the second radio coverage drone, it is the same procedure that was used for the first radio coverage drone. That is, the second radio coverage drone will detect any out of coverage Location Z and then all the three cases, as described above, will apply for the second radio coverage drone.

Hence, in view of above method steps being performed in above environment, dispatching radio coverage drones to a geographical area of a failing node in a radio network is enabled.

FIG. 4 is a schematic block diagram illustrating an example drone dispatch control arrangement 400 according to some embodiments. The drone dispatch control arrangement 400 is for a network node, wherein the network node is configured for dispatching radio coverage drones to a geographical area of a failing node in a radio network, wherein the radio coverages drones are configured to re-establish operability of the failing node. Thus, the drone dispatch control arrangement 400 may, for example, be configured to perform one or more of the method steps of FIG. 1 and FIG. 2, and/or one or more of any steps otherwise described herein, in environment 300 of FIG. 3.

The drone dispatch control arrangement 400 comprises a controller, e.g. device controlling circuitry, configured to cause generation of a radio coverage map, wherein the generated radio coverage map covers the geographical area of the failing node and geographical areas of adjacent nodes, identifies at least one mobile communication device having radio coverage from at least one of the adjacent nodes, and defines a size of the geographical area of the failing node.

The controller is further configured to cause dynamic calibration of the defined size of the geographical area of the failing node of the dynamically generated radio coverage map by causing calculation of a first distance between the identified mobile communication device and a selected one of the adjacent nodes, wherein the identified mobile communication device has coverage from the selected adjacent node while being geographically closer to the failing node than to the selected adjacent node, deduction of a second distance between the failing node and the selected adjacent node, determination of the actual size of the geographical area of the failing node based on the second and the first distance, and determination of a number of radio coverage drones to be dispatched to the geographical area of the failing node, wherein the number of radio coverage drones is based on to the actual size of the geographical area of the failing node.

The drone dispatch control arrangement 400 for a network node comprises, as mentioned above, a controller (CNTR; e.g., control circuitry or a controlling module) 410, which may in turn comprise, (or be otherwise associated with; e.g., connected or connectable to), a generator 402, e.g. generating circuitry or generating module, configured to generate a radio coverage map, wherein the generated radio coverage map covers the geographical area of the failing node and geographical areas of adjacent nodes, identifies at least one mobile communication device having radio coverage from at least one of the adjacent nodes, and defines a size of the geographical area of the failing node (compare with step 102 of FIG. 1 and FIG. 2).

The CNTR 410 may further comprise, (or be otherwise associated with; e.g., connected or connectable to), an calibrator 403, e.g. calibrating circuitry or calibrating module, configured to dynamically calibrate the defined size of the geographical area of the failing node of the dynamically generated radio coverage map (compare with step 103 of FIG. 1 and FIG. 2), a calculator 403a, e.g. calculating circuitry or calculating module, configured to calculate a first distance between the identified mobile communication device and a selected one of the adjacent nodes, wherein the identified mobile communication device has coverage from the selected adjacent node while being geographically closer to the failing node than to the selected adjacent node (compare with step 103a of FIG. 1), a deducer 403b, e.g. deducing circuitry or deducing module, configured to deduce a second distance between the failing node and the selected adjacent node (compare with step 103b of FIG. 1 and FIG. 2), and a determiner 403d, e.g. determining circuitry or determining module, configured to determine the actual size of the geographical area of the failing node based on the second and the first distance (compare with step 103d of FIG. 1 and FIG. 2).

The CNTR 410 may furthermore comprise, (or be otherwise associated with; e.g., connected or connectable to), a determiner 404, e.g. determining circuitry or determining module, configured to determine a number of radio coverage drones to be dispatched to the geographical area of the failing node, wherein the number of radio coverage drones is based on to the actual size of the geographical area of the failing node (compare with step 104 of FIG. 1 and FIG. 2), In some embodiments, the CNTR 410 may further comprise, (or be otherwise associated with; e.g., connected or connectable to), a detector 401, e.g. detecting circuitry or detecting module, configured to detect the network outage in the radio network (compare with step 101 of FIG. 1b).

In some embodiments, the CNTR 410 may further comprise, (or be otherwise associated with; e.g., connected or connectable to), a determiner 403c, e.g. determining circuitry or determining module, configured to determine a radius of an actual size of the geographical area of the failing node based on the second and the first distance (compare with step 103c of FIG. 1b).

In some embodiments, the CNTR 410 may further comprise, (or be otherwise associated with; e.g., connected or connectable to), a dispatch causer 405, e.g. dispatch causing circuitry or dispatch causing module, configured to cause dispatch of the determined number of radio coverage drones to the geographical area of the failing node for re-establishment of operability of the failing node (compare with step 105 of FIG. 1b).

The arrangement 400 may further comprise, (or be otherwise associated with; e.g., connected or connectable to), in some embodiments, a transceiver TX/RX 420, e.g. transceiving circuitry or transceiving module, configured to transmit and receive radio signals e.g. for dispatching radio coverage drones to a geographical area of a failing node in a radio network.

Hence, in view of above arrangement, dispatching radio coverage drones to a geographical area of a failing node in a radio network is enabled.

Generally, when an arrangement is referred to herein, it is to be understood as a physical product; e.g., an apparatus. The physical product may comprise one or more parts, such as controlling circuitry in the form of one or more controllers, one or more processors, or the like.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device.

Embodiments may appear within an electronic apparatus (such as a wireless communication device) comprising arrangements, circuitry, and/or logic according to any of the embodiments described herein. Alternatively or additionally, an electronic apparatus (such as a wireless communication device) may be configured to perform methods according to any of the embodiments described herein.

According to some embodiments, a computer program product comprises a computer readable medium such as, for example a universal serial bus (USB) memory, a plug-in card, an embedded drive or a read only memory (ROM).

Figure 5:
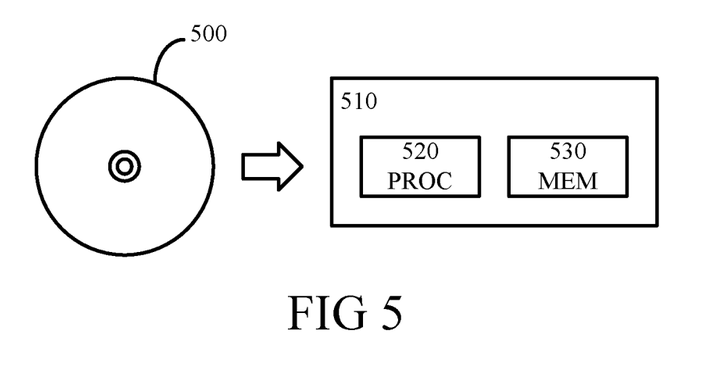
FIG. 5 is a schematic drawing illustrating an example computer readable medium according to some embodiments.

FIG. 5 illustrates an example computer readable medium in the form of a compact disc (CD) ROM 500. The computer readable medium has stored thereon a computer program comprising program instructions. The computer program is loadable into a data processor (PROC) 520, which may, for example, be comprised in a wireless communication device 510. When loaded into the data processor, the computer program may be stored in a memory (MEM) 530 associated with or comprised in the data processor.

In some embodiments, the computer program may, when loaded into and run by the data processing unit, cause execution of method steps according to, for example, FIG. 1 and FIG. 2, and/or one or more of any steps otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims.

Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A method for dispatching radio coverage drones to a geographical area of a failing node in a radio network, wherein the radio coverages drones are configured to re-establish operability of the failing node, the method comprising the following steps being performed by a network node:
   generating a radio coverage map, wherein the generated radio coverage map covers the geographical area of the failing node and geographical areas of adjacent nodes, identifies at least one mobile communication device having radio coverage from at least one of the adjacent nodes, and defines a size of the geographical area of the failing node,
   dynamically calibrating the defined size of the geographical area of the failing node of the dynamically generated radio coverage map by:
      calculating a first distance between the identified mobile communication device and a selected one of the adjacent nodes, wherein the identified mobile communication device has coverage from the selected adjacent node while being geographically closer to the failing node than to the selected adjacent node,
      deducing a second distance between the failing node and the selected adjacent node, determining the actual size of the geographical area of the failing node based on the second and the first distance, and determining a number of radio coverage drones to be dispatched to the geographical area of the failing node, wherein the number of radio coverage drones is based on the actual size of the geographical area of the failing node.

2. The method of claim 1, wherein the failing node is inoperative due to a network outage in the radio network, and wherein the method comprises the step of:

detecting the network outage in the radio network.

3. The method of claim 1, wherein the generating of the radio coverage map is initiated by triggering a Self-Organizing Network (SON) function in adjacent nodes to the failing node.

4. The method of claim 1, further comprising the step of:

causing dispatch of the determined number of radio coverage drones to the geographical area of the failing node for re-establishment of operability of the failing node.

5. The method of claim 1, wherein the radio coverage drones are configured to re-establish operability of the failing node for a pre-determined geographical coverage area at arrival at the geographical area of the failing node.

6. The method of claim 1, wherein one or more of the radio coverage drones are dispatched to the geographical area of the failing node for landing on or in connection with the failing node.

7. The method of claim 1, wherein one or more of the radio coverage drones are configured to connect directly to the failing node, via a wireless or wired connection, and establish a radio coverage link to the radio network.

8. The method of claim 1, further comprising sending a landing location to the radio coverage drones from the network node at dispatch.

9. The method of claim 1, further comprising determining an adjusted landing location of the radio coverage drones based on a dynamic change of the actual size of the geographical area of the failing node after dispatch.

10. The method of claim 1, wherein the dynamic change is based on movements of the at least one mobile communication device having radio coverage from at least one of the adjacent nodes.

11. An arrangement for a network node configured for dispatching radio coverage drones to a geographical area of a failing node in a radio network, wherein the radio coverages drones are configured to re-establish operability of the failing node, the arrangement comprising a controller configured to cause:

generation of a radio coverage map, wherein the generated radio coverage map covers the geographical area of the failing node and geographical areas of adjacent nodes, identifies at least one mobile communication device having radio coverage from at least one of the adjacent nodes, and defines a size of the geographical area of the failing node, dynamic calibration of the defined size of the geographical area of the failing node of the dynamically generated radio coverage map by causing:

calculation of a first distance between the identified mobile communication device and a selected one of the adjacent nodes, wherein the identified mobile communication device has coverage from the selected adjacent node while being geographically closer to the failing node than to the selected adjacent node, deduction of a second distance between the failing node and the selected adjacent node, determination of the actual size of the geographical area of the failing node based on the second and the first distance, and determination of a number of radio coverage drones to be dispatched to the geographical area of the failing node, wherein the number of radio coverage drones is based on the actual size of the geographical area of the failing node.

12. The arrangement of claim 11, wherein the failing node is inoperative due to a network outage in the radio network, and wherein the controller is further configured to cause:

detection of the network outage in the radio network.

13. The arrangement of claim 11, wherein the generation of the radio coverage map is initiated by a triggered Self-Organizing Network (SON) function in adjacent nodes to the failing node.

14. The arrangement of claim 11, wherein the controller is further configured to cause:

dispatch of the determined number of radio coverage drones to the geographical area of the failing node for re-establishment of operability of the failing node.

15. The arrangement of claim 11, wherein the radio coverage drones are configured to re-establish operability of the failing node for a pre-determined geographical coverage area at arrival at the geographical area of the failing node.

16. The arrangement of claim 11, wherein one or more of the radio coverage drones are dispatched to the geographical area of the failing node for landing on or in connection with the failing node.

17. The arrangement of claim 11, wherein one or more of the radio coverage drones are configured to connect directly to the failing node, via a wireless or wired connection, and establish a radio coverage link to the radio network.

18. The arrangement of claim 11, wherein the controller is further configured to cause sending of a landing location to the radio coverage drones from the network node at dispatch.

19. The arrangement of claim 11, wherein the controller is further configured to cause determination of an adjusted landing location of the radio coverage drones based on a dynamic change of the actual size of the geographical area of the failing node after dispatch.

20. The arrangement of claim 11, wherein the adjusted landing location of the radio coverage drones comprises change of landing location in the geographical area of the failing node or return to a drone dispatch base.

* * * * *